Nov. 10, 1942.  J. M. KRULL  2,301,729
SHRIMP VEINING MACHINE
Filed June 28, 1940  2 Sheets-Sheet 2
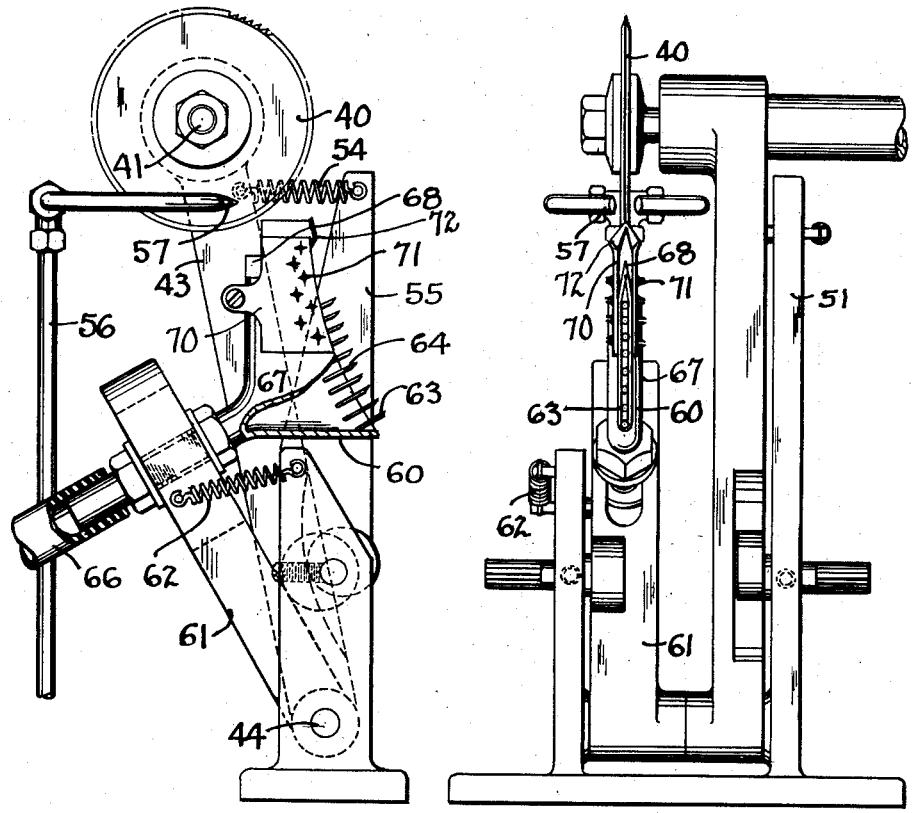
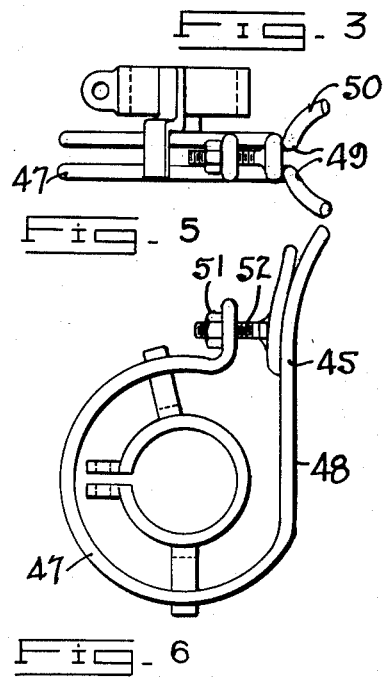
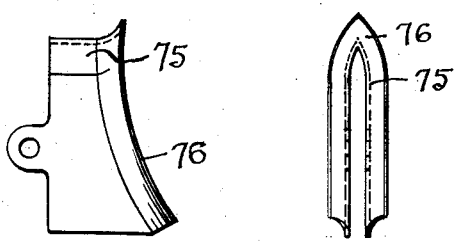
INVENTOR.
JOHN M. KRULL
BY Lester B. Clark
ATTORNEY Patented Nov. 10, 1942

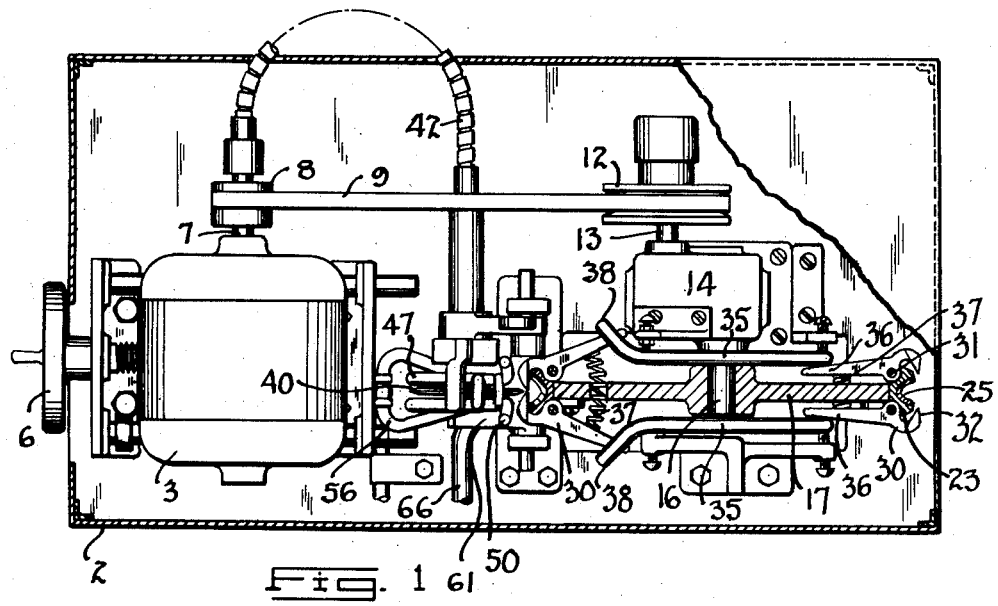
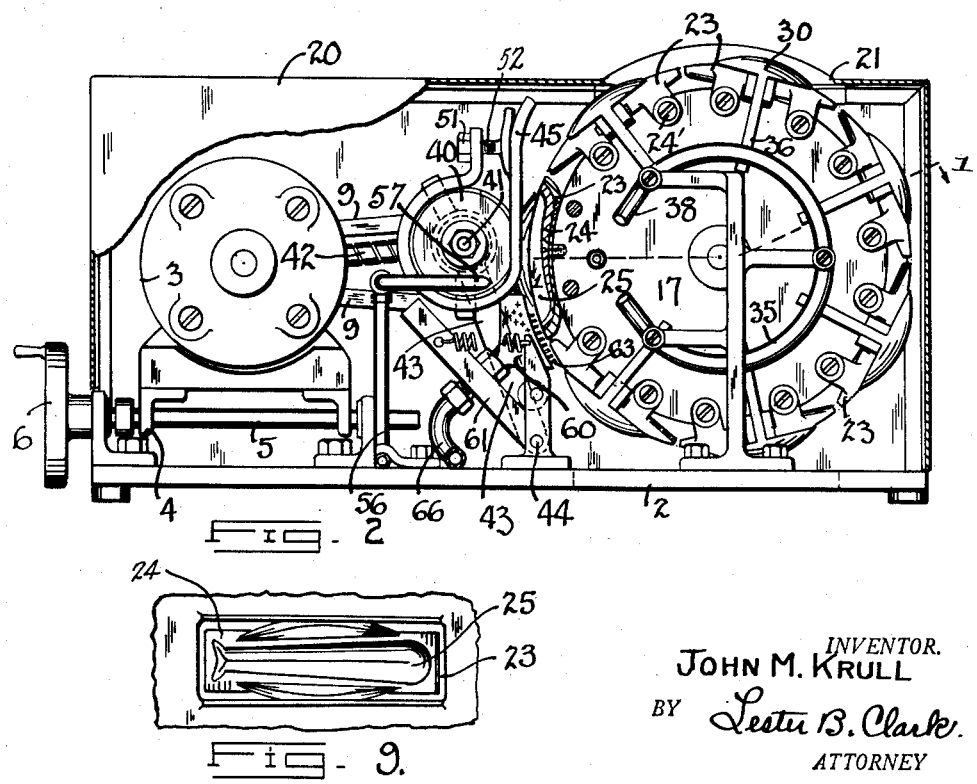

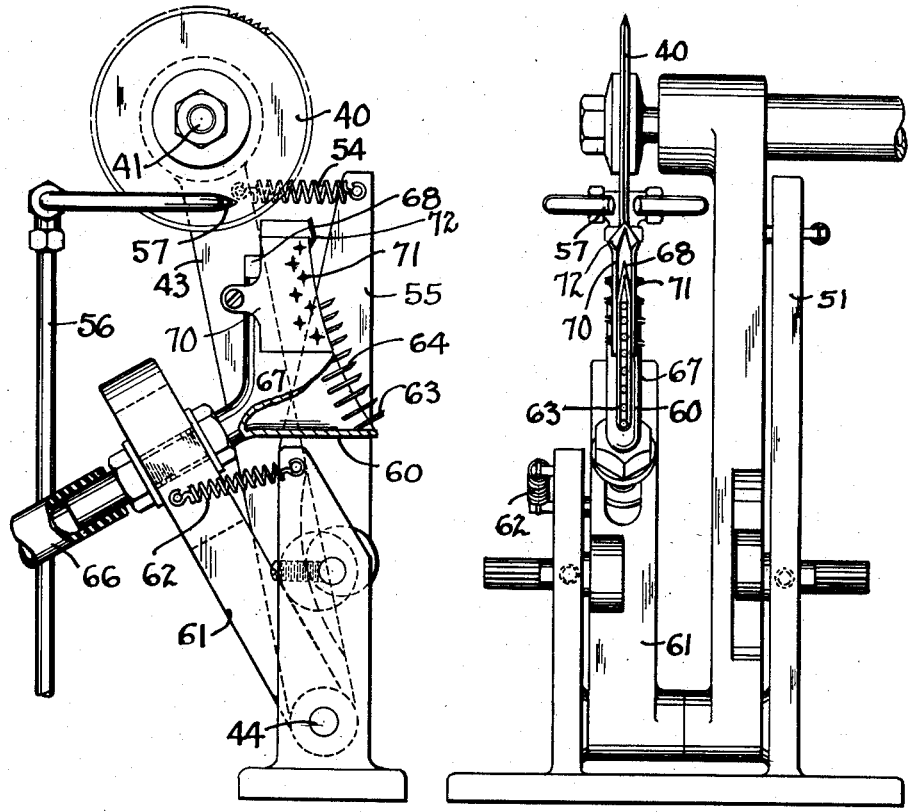
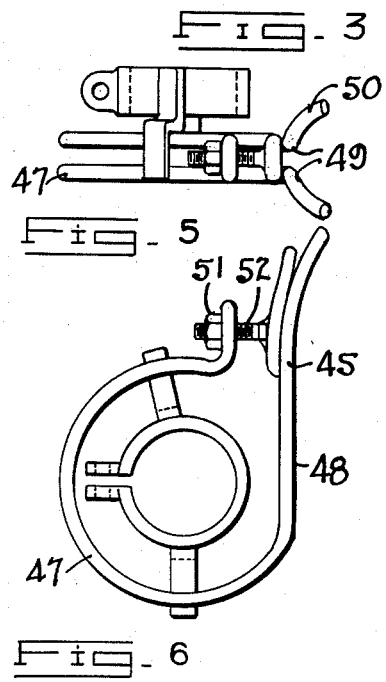
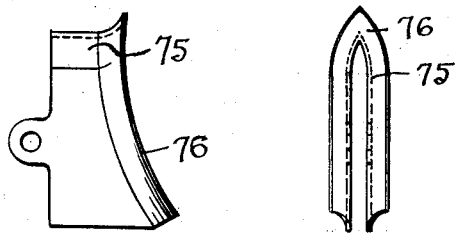

2,301,729

UNITED STATES PATENT OFFICE 2,301,729

SHRIMP VEINING MACHINE

John M. Krull, Houston, Tex., assignor of one-half to Forrest McDaniel, Houston, Tex.

Application June 28, 1940, Serial No. 342,840

16 Claims. (Cl. 17—2)

The invention relates to a shrimp veining machine. In the marketing of shrimp the usual practice has been to dehead the shrimp at the dock when they are landed and to then market the shrimp less the heads in exactly their natural condition wherein the body of the shrimp is firmly enclosed in the shell or jacket.

The shrimp as thus marketed, come to the consumer to be boiled or otherwise treated and it is rather a difficult, slow and tedious problem to remove the shells regardless of whether the shells are removed before or after cooking. When the shell is removed a small vein remains along the back of the shrimp. This vein is embedded slightly below the surface of the body of the shrimp and has overlying it and concealing it a thin layer of meat or flesh. It is objectionable to serve the shrimp containing this vein, because it is black and unsightly as well as being detrimental to the flavor and keeping qualities. It has therefore been the practice to vein the shrimp either before or after they are cooked, and after the shells have been removed.

The present invention contemplates a means of veining the shrimp by splitting the shell and removing the vein before the shrimp are marketed so that the consumer does not have the tedious task of removing the vein, and the task of removing the shell is expedited.

It is one of the objects of the present invention to provide a means of veining raw shrimp.

Another object of the invention is to provide a machine for veining shrimp by slitting the back of the shell and removing the vein.

Another object of the invention is to facilitate the removal of the shell of the shrimp by slitting the shell along the back.

Another object of the invention is to provide a shrimp veining machine wherein the shrimp are mounted on a carrier and subjected to a slitting and washing action.

Still another object of the invention is to provide a shrimp veining machine which will compensate automatically for shrimp of various sizes so that the shell of the shrimp may be slit and the vein removed very readily.

Other and further objects of the invention will be readily apparent when the following description is considered in connection with the accompanying drawings herein.

Fig. 1 is a top plan view looking down on the shrimp veining machine, the carrier wheel 17 being shown in section along the broken line 1—1 of Figure 2.

Fig. 2 is a side elevation of the machine of Fig. 1 with certain parts shown in section to illustrate the arrangement thereof.

Fig. 3 is a side elevation showing an enlarged view of the vein removing device.

Fig. 4 is an end view looking into the face of the cutter of the vein removing device.

Fig. 5 is a top plan view looking down on the gauge device to control the depth of the cut irrespective of the size of the shrimp being processed.

Fig. 6 is a side elevation of the gauge device of Fig. 5.

Fig. 7 is a side elevation of the shell spreading shoe for holding the shell open while the vein is being removed.

Fig. 8 is a front elevation of the shell spreading shoe.

Fig. 9 is a top plan view looking down on one of the shrimp pockets of the carrier of Fig. 2.

In Fig. 1 a frame is illustrated generally at 2 and is arranged to support a power unit 3 which is in the form of an electric motor. This motor is mounted upon an adjustable base 4 which can be moved laterally as seen in Fig. 2, by adjustment of the shaft 5 by the hand wheel 6. Shaft 7 of this motor is arranged to rotate a pulley 8 to operate the belt 9.

The belt 9 in turn drives a pulley 12 mounted on the shaft 13 and leading into a gear box or speed reducing unit 14. This unit serves to drive the carrier shaft 16 upon which is mounted the carrier 17 in the form of a wheel.

The frame 2, including the housing 20 which is arranged to enclose all of the parts except the upper part of the carrier wheel 17, which projects through at opening 21 in the top of the housing 20. The carrier projects in this manner so that the shrimp may be placed in the carrier wheel for processing.

The carrier wheel is of a peculiar construction, as will be seen in Fig. 2 wherein it is provided with a plurality of fittings 23 attached to the wheel by the screws 24' so that they project from the periphery of the wheel. Each of these fittings 23 receives a die 24 which is formed with a recess 25 shaped to the general configuration of a shrimp, as will be seen in Fig. 9. Each of these fittings, therefore, may be termed a "pocket" into which the shrimp is deposited by the operator, face down, with the back projecting above the edge of the pocket.

As may be seen in Fig. 2, there are a plurality of these pockets on wheel 17 and it is to be understood that the wheel is to be of any desired size and any number of pockets provided.

As the wheel or carrier 17 turns, the operator will place the shrimp in the pockets as they appear in the opening 21. The carrier 17 is arranged to rotate as seen in Fig. 2, in a counter-clockwise direction so as to carry the shrimp downwardly into the machine.

In order to insure that the shrimp will be held firmly in the pocket a pair of clamping arms 30 are provided. These arms are pivoted at 31 as best seen in the right hand side of Fig. 1, to the edge of the fittings 23. Each of these arms 30 has a projecting finger 32 which can pass over the top of the pocket 25. On the right hand side of Fig. 1 the clamping device is shown as opened up so that it will have released the shrimp, whereas, in the center of Fig. 1 the arms are shown as overlying the pocket and they would be engaging a shrimp if it were present in the pocket. The two fingers 32 will engage the shrimp at the side of the back but above the center thereof, so that the shrimp will be held securely in the pocket 25.

In order to operate this clamping mechanism to receive, retain and release the shrimp, a guide track-way or cam 35 has been arranged at each side of the carrier wheel 17. These cams are best seen in Figs. 1 and 2 and are of a configuration such that through a major portion of the revolution the clamping device will be retracted as seen in the right hand side of Fig. 1 by having the lever portions 36 of the clamping arms compressed by the guide track-way. The springs 37 normally urge the lever portions 36 outwardly as seen in Fig. 1.

The guide track-way 35 has flare ends 38 at each end thereof so that when the shrimp is placed in the pocket and the wheel turns in a counter-clockwise direction so that the lever arms 36 pass beyond the ends 38 the lever arms will move outwardly and the fingers 32 will grip the shrimp firmly during that part of the rotation during which the shrimp is to be slit. The ends of the guide track are spaced apart a short distance so that after the slitting action the arms are again guided inwardly by the lower curved ends 38 so that the gripping fingers 32 are retracted and the shrimp released to fall by gravity from the carrier. During the remainder of the revolution the clamping device remains retracted so that a shrimp can be inserted when it reaches the upper portion of its path.

From the foregoing it should be apparent that the wheel may rotate at any desired speed and the operator will merely insert the shrimp in the pockets as they appear at the top of the machine. The shrimp is automatically gripped by the clamping device and held firmly in the pocket so that it will present a firm surface for the cutting device which is about to be described. After the shell of the shrimp has been slit by the cutting operation the wheel continues its rotation and the shrimp is then released. The pockets will be made in various sizes to accommodate different sized shrimp and the proper size pocket attached.

One form of a cutting device is seen in Figs. 1 and 2 in the form of a rotating cutter blade 40 which is mounted on a shaft 41 for rotation by means of a flexible shaft 42, which shaft projects from the motor shaft 7.

The cutter shaft 41 is mounted upon a supporting arm 43 which is pivoted at 44 to the framework and is normally urged toward the carrier wheel. This cutter blade 40 rotates in the same plane as the carrier wheel 17 so that when one of the pockets moves downwardly in front of the cutter blade the blade will slit the shell of the shrimp along the back. Inasmuch as the head end of the shrimp approaches the cutter first, the cutter will readily enter into the shell and slit it as the shrimp passes the cutter. It is desirable that the cutter not only cut the shell but that it slit the thin layer of meat or flesh which overlies the vein as well so that the body of the shrimp will be opened up and permit the ready removal of the vein.

In order to determine the depth to which the knife will penetrate the shrimp, a gauge device 45 has been arranged upon the cutter and this device is best seen in Figs. 5 and 6, wherein a curved member can be clamped to the cutter support so as to present a forward facing 48. This facing is in the form of a pair of spaced rod portions 49 whose upper ends 50 flare away from each other. This forward facing 48 is adjustable by means of the nut 51 on the bolt 52 so that its relative position may be controlled. The rods 49 are arranged to ride up over the sides of the back of the shrimp as it is carried in a counter-clockwise direction as seen in Fig. 2 so that when this gauge device 45 is once adjusted relative to the cutter blade then a slit of the same depth will always be made in the back of the shrimp irrespective of the size of the shrimp.

It seems clear that as the shrimp pass into engagement with the cutter that it will be moved away from the carrier against the resistance of the spring 54 which normally urges the cutter support 43 toward the carrier. This construction is seen and enlarged in Fig. 3. The spring 54 is affixed to the upper end of a bracket 55 carried by the frame.

In order to keep the cutter blade flushed clean of materials a water pipe 56 has a discharge end 57 positioned adjacent the cutter blade where it emerges from the slit in the shrimp.

After the shell has been slit and the flesh along the back also slit, then the vein will be exposed so that it can be readily removed. To accomplish this a removal device 60 is mounted upon an arm 61 also pivoted to the pin of shaft 44. The spring 62 urges this device toward the carrier so as to force the bristles or brushes 63 into the slit in the back of the shrimp. These bristles project from the housing or body 64, a suitable distance so that as a shrimp passes these bristles or tines the vein will be caught thereby and pulled from its position in the shrimp's body. In order to assist in the removal of the vein a pipe 66 is connected to the removal device so as to feed water or flushing liquid through the housing 67 of the removal device to discharge forwardly between the bristles or tines 63. Any suitable pressure can be applied to this flushing liquid as circumstances may require, the object being to completely remove the vein at this phase of the operation. In order that the removal device will move into the slit in the shell which has been made by the cutter, the upper end thereof is pointed or tapered as seen at 68 in Figs. 3 and 4.

In some instances a spawn is present on the shrimp adjacent the area where the slit is made and it is desirable to remove this spawn as the shrimp is being processed. To accomplish this, a shoe 70 seen in Figs. 3 and 4 may be mounted over the top of the removal device 60 and particularly the housing portion 67 thereof. This shoe will have a plurality of somewhat irregular projections 71 on the side thereof as best seen in Figs. 3 and 4. Any spawn present in the shrimp will become engaged with these irregular projections and in this manner either removed by the projections themselves, or flushed out by the stream of washing liquid. The upper end of this shoe 70 may carry the flange 72 so as to assist in spreading the shell so that it will overlie the projections as they pass into the slit.

In some instances it may be desirable to merely slit the shell, and with this in mind a shoe 75 is shown in Figs. 7 and 8. This shoe has a flange 76 along each side which is curved to conform to the curvature of the back of the shrimp being processed, and when this attachment is affixed to the removal device 60 the shell will be slit so that the shell moves along over the edge of this flange to prevent it from interfering with the cleaning operation.

While a rotating cutter has been shown and described, it is to be understood that the cutter need not necessarily rotate and a sharp, stationary cutter may be mounted on arm 43 and the shaft or spindle 41 omitted. The gauge device 45 may be provided with the stationary cutter the same as it was with the rotating cutter. With the stationary cutter if a sharp, thin blade is provided, it has been found that the shell will be properly split and it is to be understood that the invention contemplates such a cutter.

If desired, the stationary cutter thus described may be mounted on the top or hood portion 68 of the removal device and the arm 43 dispensed with.

Broadly, the invention contemplates a shrimp veining machine wherein the raw shrimp will be slit and the vein removed prior to marketing the shrimp so that the shrimp can be readily shelled by the consumer with the knowledge that the vein is already removed.

What is claimed is:

1. A shrimp veining machine including a frame, a cutter blade mounted for operation on said frame to slit the shell of the shrimp along the back, means to receive, retain and carry the shrimp past said cutter to slit the shell, and additional means to remove the vein along the back of the shrimp after the shell is slit.

2. A shrimp veining machine including a frame, a cutter blade mounted for operation on said frame to slit the shell of the shrimp along the back, means to receive, retain and carry the shrimp past said cutter, and additional means to remove the vein along the back of the shrimp after the shell is slit, said first means including a rotary carrier.

3. A shrimp veining machine including a frame, a cutter blade mounted for operation on said frame to slit the shell of the shrimp along the back, means to carry the shrimp past said cutter, and additional means to remove the vein along the back of the shrimp after the shell is slit, said first means including a rotary carrier having a pocket thereon of a configuration to retain and support a shrimp.

4. A shrimp veining machine including a frame, a cutter blade mounted for operation on said frame to slit the shell of the shrimp along the back, means to carry the shrimp past said cutter, and additional means to remove the vein along the back of the shrimp after the shell is slit, said first means including a rotary carrier having shrimp pockets thereon and clamping means to resiliently receive, retain and release the shrimp.

5. A shrimp veining machine including a frame, a cutter blade mounted for operation on said frame to slit the shell of the shrimp along the back, means to carry the shrimp past said cutter, additional means to remove the vein along the back of the shrimp after the shell is slit, said first means including a rotary carrier having shrimp pockets thereon and clamping means to resiliently receive, retain and release the shrimp, and a timing mechanism to operate said clamping means.

6. A shrimp veining machine including a frame, a cutter blade mounted for operation on said frame to slit the shell of the shrimp along the back, means to carry the shrimp past said cutter, additional means to remove the vein along the back of the shrimp after the shell is slit, said first means including a rotary carry, and a gauge device to urge said cutter against the shrimp so as to make a cut of predetermined depth irrespective of the size of the shrimp.

7. In a shrimp veining machine for slitting the back of the shell and removing the vein, a rotary carrier, a plurality of shrimp receiving pockets on the periphery thereof, each of said pockets being shaped to the general configuration of a shrimp, and means for slitting the back of the shrimp.

8. In a shrimp veining machine for slitting the back of the shell and removing the vein, a rotary carrier, a plurality of shrimp receiving pockets on the periphery thereof, each of said pockets being shaped to the general configuration of a shrimp, means to engage the shrimp to retain it firmly in each pocket, and means for slitting the back of the shrimp.

9. In a shrimp veining machine a rotary carrier and a plurality of shrimp receiving pockets on the periphery thereof, each of said pockets being shaped to the general configuration of a shrimp and being provided with a pair of clamping arms having portions to overlie each of the pockets.

10. In a shrimp veining machine a rotary carrier, a plurality of shrimp receiving pockets on the periphery thereof, each of said pockets being shaped to the general configuration of a shrimp and including a pair of clamping arms having portions to overlie each of the pockets, and a guide track to control the movement of said arms so as to move the arms to grip, retain and release the shrimp during predetermined periods of a rotation of the carrier.

11. In a shrimp veining machine a carrier for the shrimp, a cutter to slit the shell along the back of the shrimp without removing the shell, and means to remove the vein from within the shell.

12. In a shrimp veining machine a carrier for the shrimp, a cutter to slit the shell along the back of the shrimp without removing the shell, and means to remove the vein from within the shell, said last means including a brush.

13. In a shrimp veining machine a carrier for the shrimp, a cutter to slit the shell along the back of the shrimp without removing the shell, and means to remove the vein from within the shell, said last means including a brush and means to wash out the vein.

14. In a shrimp veining machine a carrier for the shrimp, a cutter to slit the shell along the back of the shrimp without removing the shell, means to remove the vein from within the shell, and additional means to remove the spawn.

15. In a shrimp veining machine, means to carry the shrimp, means to slit the shrimp, and means to spread the shell and remove the vein.

16. In a shrimp veining machine, means to carry the shrimp, means to slit the shrimp, and means to spread the shell and remove the vein, said last means including a detachable shoe.

JOHN M. KRULL.